Oct. 26, 1965 G. MONGODIN 3,214,203
SEALED FLANGE JOINTS FOR PIPE LINES
Filed March 19, 1962 2 Sheets-Sheet 1

Oct. 26, 1965  G. MONGODIN  3,214,203
SEALED FLANGE JOINTS FOR PIPE LINES
Filed March 19, 1962  2 Sheets-Sheet 2

United States Patent Office 3,214,203
Patented Oct. 26, 1965

3,214,203
SEALED FLANGE JOINTS FOR PIPE LINES
Guy Mongodin, Suresnes, France, assignor to Societe de Construction d'une Usine de Separation Isotopique, Seine, France
Filed Mar. 19, 1962, Ser. No. 180,690
Claims priority, application France, Mar. 30, 1961, 857,364, Patent 1,293,138
1 Claim. (Cl. 285—414)

The present invention relates to joints for pipelines of the kind comprising clamping flanges.

Flange joints generally comprise flange members mounted on or connected to the parts to be joined. When a connection is to be made by bringing the two opposed flanges together, after interposing a sealing ring or gasket, and tightening them against one another by bolts, it is often difficult to bring into registration the sets of holes through which the bolts are to be passed.

The flanges, or at least certain parts of them, are thus made so that they can be oriented about the joint axis, which facilitates in particular, irrespective of the positions of the conduits being assembled, location of the bolts or other securing members.

This arrangement, however, requires flange members of several parts which must be successively mounted on the pipes and carefully assembled on both parts of the joint.

To offset this disadvantage and permit rapid assembly, the present invention has the object of providing a joint, in which the various parts can be previously mounted on each of the ends of the pipes to be connected and brought into register by simple rotation of one of them about the joint axis. A joint of this kind can be readily put into place from a distance, if necessary.

The invention provides a joint, which comprises flange members for attachment to the pipe sections and removable collar members rotatably mounted on the flange members, the collar members being connectible together for joining the two pipe sections.

The pipeline joint of the invention can be used in various ways and can be carried out in various forms. The invention also contemplates, in particular and as an improved article of manufacture, systems of the kind in question based upon the various embodiments of the joint, as well as various constituent parts which can be used in such systems and the assemblies or apparatus comprising such systems.

In order that the invention may be readily understandable to those skilled in the art, various preferred embodiments thereof are described below, by way of example only, in conjunction with the accompanying drawings, in which.

Figure 1:
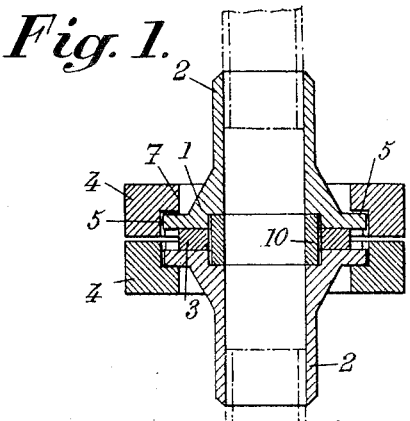
FIGS. 1 and 2 show an axial sectional view and a plan view, respectively, of one form of pipeline joint of the invention.
Figure 3:
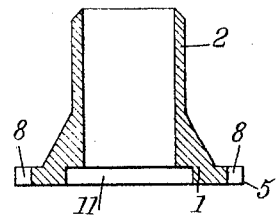
FIGS. 3 and 4 show an axial sectional view and a plan view, respectively, of the flange member used in the joint of FIGS. 1 and 2.
Figure 2:
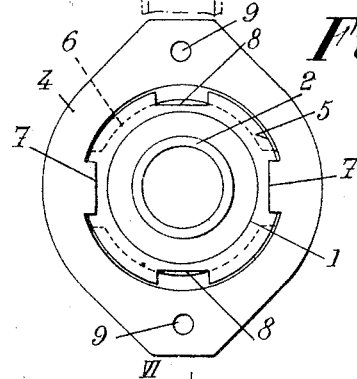
Figure 4:
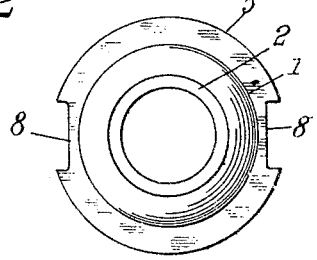
Figure 5:
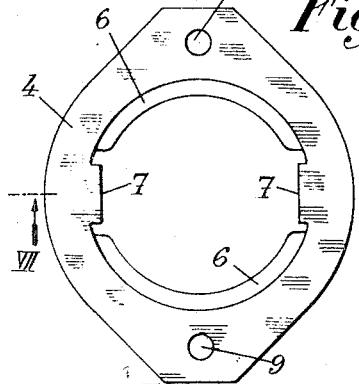
Figure 6:
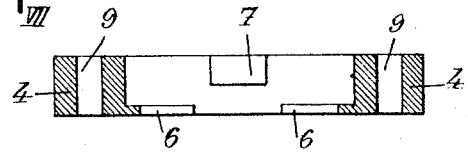
Figure 7:
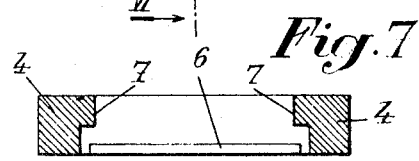
Figure 8:
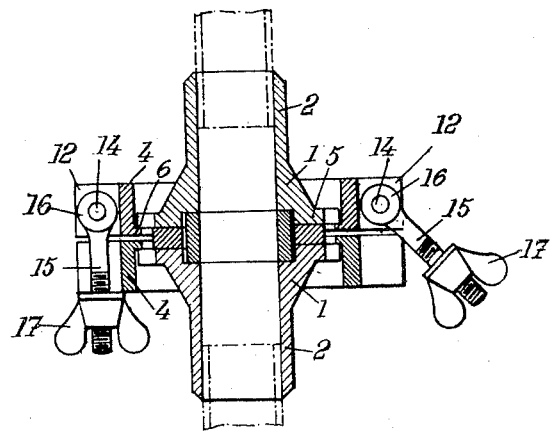
Figure 9:
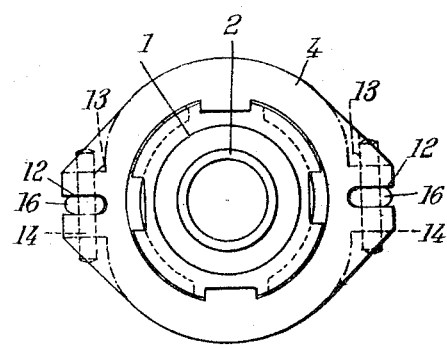

FIGS. 5, 6 and 7 show a collar member used in the joint of FIGS. 1 and 2, FIG. 5 being a plan view and FIGS. 6 and 7 being sectional views on the lines VI—VI and VII—VII, respectively, of FIG. 5;

FIGS. 8 and 9 show axial sectional and plan views, similar to FIGS. 1 and 2, of another embodiment of the joint of the invention.

Referring to FIGS. 1 to 7, the pipeline joint there shown comprises flange members 1, to be connected to the ends of the pipe sections to be joined, for example, by means of connecting sleeves 2 integral with the flange members 1, the surface areas of which are relatively small, but are sufficient to permit assembly and clamping of a gasket or sealing ring 3 (FIG. 1), and, also, collar members 4, to be removably arranged on the flange members 1, with freedom to rotate relative thereto, means being provided both on the collar members and on the flange members to allow such arrangement.

Taking the mounting arrangements, for instance, as being of the bayonet joint type, they are constituted by arcuate lugs 5 provided on the flanges 1, which lugs can be inserted between internal projections 6 on the collar members 4 and detents or the like such as 7 also provided on the collar members.

In order to allow the collar members 4 to be put in place, the lugs 5 include gaps 8 through which the detents 7 can pass.

When the detents 7 have passed through the gaps 8, each collar member undergoes rotation about the joint axis through an angle of 90°, for example, to reach its final location. It is to be understood that this angle is mentioned only as an example and that it is possible to select any position which will depend, in general, on the relative positions of the respective connecting sleeves 2, the essential being that the holes 9 in the collar members 4 can be readily moved into alignment or register to allow connecting bolts to be inserted therein.

The assembly can be completed by means of an inner bushing 10 providing, at least partially, for continuity of the inner surfaces of the two joint assemblies, the bushing 10 being located in counterbores or other recesses 11 (FIG. 3) and without hindering proper operation of the sealing ring or rings 3.

It has been assumed above that the connection between the collar members 4 is effected by means of bolts passing through the holes 9. Any other means can be provided, however, such as those used in the embodiment described below.

In this embodiment, the connection means are constituted by hinged bolts provided laterally on the collar members, for example in spaced lugs and preferably mounted in a removable manner.

As shown in FIGS. 8 and 9, the collar members 4 can each comprise, for this purpose, opposed notches 12, in association with transverse apertures 13 for receiving hinge pins 14.

With such an arrangement, it is possible to mount bolts 15, in the notches 12 of one of the confronting collar members, which have heads in the form of eyelets 14 in which the hinge pins 14 are located. In its clamping position, each bolt 15 is pivoted into the notch 12 in the other collar member and is tightened by means of a wing-nut 17.

FIG. 9 also shows, in dotted lines, a modified form of flange member.

Joints made in this way have numerous advantages in comparison with known arrangements, and in particular they:

Facilitate assembly, irrespective of the position assumed in assembly by the two confronting pipe sections, and thus always allow the bolt holes to be moved into alignment;

Allow rapid assembly;

Allow low manufacturing tolerances to be used, with consequent economic saving, while retaining complete interchangeability between all joints of the same type.

What I claim is:

A pipe joint for connecting two pipe sections comprising a clamping flange member fixed on each pipe section, a removable collar member freely and rotatably mounted on each of said flange members, an inner periphery in each of said collar members, diametrically opposed internal projections on said inner periphery of each of said collars, diametrically opposed internal detents spaced axially from said projections on said inner periphery of each of said collars, each of said flange members having an annular portion rotatably secured between said detents and said projections of their respective collars thereby axially securing said collars to the respective one of said flange members, diametrically opposed gaps on each of said flange members slightly larger than said internal detents for receiving the respective ones of said detents in connecting and disconnecting said collar members and said flange members and diametrically opposed clamping means disposed adjacent to said internal projection on each of said collar members for holding said collar members together said collar members being rotatable on said flange members for alignment of said clamping means during assembly of the pipe joint.

References Cited by the Examiner

UNITED STATES PATENTS

| 95,621 | 10/69 | Weyerman | 285—412 |
| 1,535,294 | 4/25 | Collins | 285—412 |
| 1,992,503 | 2/35 | Penick | 285—368 |
| 2,009,650 | 7/35 | Claussen | 285—268 |
| 2,900,199 | 8/59 | Logan | 285—363 |
| 2,944,842 | 7/60 | Stiff | 285—368 |

FOREIGN PATENTS 668,578   7/29   France.

CARL W. TOMLIN, *Primary Examiner.*

THOMAS F. CALLAGHAN, *Examiner.*